UNITED STATES PATENT OFFICE.

JOHN C. CLANCY AND LUKE WAGSTAFF MARSLAND, OF SYDNEY, NEW SOUTH WALES, AUSTRALIA.

PROCESS OF TREATING ZINC SULFID ORES.

SPECIFICATION forming part of Letters Patent No. 715,023, dated December 2, 1902.

Application filed February 16, 1901. Serial No. 47,687. (No specimens.)

*To all whom it may concern:*

Be it known that we, JOHN COLLINS CLANCY, analytical chemist and metallurgist, and LUKE WAGSTAFF MARSLAND, solicitor, citizens of the Commonwealth of Australia, and subjects of the King of Great Britain, and residents at Mutual Life of New York Buildings, Martin Place, Sydney, New South Wales, in the Commonwealth of Australia, have invented a new and useful improved process for the elimination of zinc from sulfid ores and the extraction and recovery of lead, silver, gold, and other metals therefrom and from other sulfid ores, of which the following is a specification.

The object of our invention is to provide means whereby zinc may be eliminated and recovered from sulfid ores, and lead, silver, gold, and other metals may be extracted and recovered from complex sulfid ores (whether containing zinc or not) economically and efficiently. By this improved process zinc is cheaply, quickly, and easily eliminated from the sulfid ores, whether of low or of high grade, and may be cheaply recovered and made fit for commercial purposes and the other metallic contents of the ore—such as lead, silver, gold, and other metals—may thereafter be cheaply recovered by smelting. The residual ore after treatment by our process is in a condition which readily undergoes fusion, requiring practically no additional fluxing material for the smelting.

All the chemical reagents used in our process are recovered in the process in a state fit for use again.

The sulfid ore to be treated is finely pulverized by either the wet or dry method; but if wet it is dried after pulverization. This pulverized ore is then treated by what we term our "low-temperature" step or process, as hereinafter described. In the low-temperature operation to the dry pulverized ore is added lead sulfate in proportions varying according to the quantity of zinc contained in the ore—that is to say, about thirty-five parts of lead sulfate to thirty parts of metallic zinc. In practice we have found that the addition of from about fifteen to thirty parts of lead sulfate to sulfid ores containing from about fifteen to thirty parts of metallic zinc is sufficient for the satisfactory working of the process. In the low-temperature operation the ore and lead sulfate are then roasted in a Hasenclever muffle-furnace or any suitable reverberatory furnace, the ore mixture being charged into the furnace by means of a hopper placed near the flue on top of the furnace. The ore mixture is spread over the hearth in a layer about two inches thick, and as soon as it attains a dull-red heat it is stirred from time to time, so as to expose every particle of it to the action of the oxygen contained in a hot blast. The roasted ore is withdrawn in manner hereinafter described from the furnace in charges of convenient quantity. As soon as the first charge of roasted ore has been withdrawn from the furnace the ore remaining in the furnace is moved along toward the fire-bridge, the vacant space then left at the flue end of the furnace receiving a fresh charge of raw ore. The drawing of the roasted ore and the introduction of a fresh charge occurs at intervals of from one to two hours, the time occupied in roasting varying with the nature of the ore and the amount of rabbling or stirring. During the passage from the flue-bridge to the fire-bridge the charges are subjected to a gradually-increasing temperature—say from about 500° to 800° centigrade—but so as not to volatilize the lead contained in the ore or the added lead sulfate. The charge near the fire-bridge becomes pasty at about 700° centigrade and must be thoroughly mixed or stirred to allow access of the oxygen of the hot blast. When the pasty consistency has disappeared, the ore is withdrawn from the furnace for further treatment, hereinafter described. During the roasting process sulfur-dioxid gas is generated. By experience we have found rapid decomposition of the zinc-blende is caused by the lead sulfate, which parts with its sulfuric anhydrid at a temperature of between 600° and 650° centigrade. The sulfuric anhydrid so formed combines with the sulfur contained in the zinc-blende, forming sulfur-dioxid gas, which is carried by the draft of the furnace to and arrested by a sulfuric-acid chamber placed in the flue and there converted into sulfuric acid in the ordinary manner. This sulfuric acid may be recovered and either disposed of commercially or used for the extraction of zinc from the roasted ore in the manner hereinafter described.

The roasted ore resulting from the before-described operations as it is withdrawn from the furnace is immediately transferred to a vat of a convenient size about half-full of a dissolving solution consisting of a mixture of ten parts of sulfuric acid and ninety parts of water. As the hot roasted ore meets the solution it generates steam, which disintegrates the ore and at the same time raises the temperature of the solution to boiling-point, the heat greatly assisting the dissolving action of the solution upon the zinc contained in the ore. The contents of this vat are agitated, stirred, and broken up, so that the roasted ore is kept continuously working during the process of lixiviation of the ore. The sulfuric-acid solution is conducted into the vat continuously from a storage-vat. When the ore has been sufficiently lixiviated, (as may be determined by testing it from time to time,) which by experiment we have proved occurs in about forty minutes, the contents of the vat, together with the solution, are discharged through a large pipe fitted at the bottom of the vat, the agitation being continued during the process of discharging. This discharged lixiviated ore, together with the solution which now contains the zinc in the form of zinc sulfate, is made to flow over concentrating-tables or other similar apparatus, whereby and whereon lead oxid is separated from the other ore particles, the amount of lead so separated being at least equal in quantity to the lead contained in the lead sulfate which was added to the ore in the form of lead sulfate before or during the roasting. The lead recovered from the concentrating-tables is then transferred to a separate vat containing a solution of sulfuric acid consisting of twenty parts sulfuric acid and eighty parts water and converted into lead sulfate to be used for the cyclic operation of supplying the necessary proportions of lead sulfate to succeeding charges of ore to be roasted in the furnace. The remaining portion of the partially-treated ore, still containing the remainder of the lead and practically all the silver, gold, and other metals contained in the roasted ore, together with the zinc solution in the form of zinc sulfate, is conducted into a settling-vat, where the ore, together with the fine particles in suspension, is allowed to settle, and the solution containing the zinc salts is drawn or leached off and conducted into another separate vat, there to be treated for the recovery of the zinc contents. The ore contained in the settling-vat is then mixed with another hot solution consisting of two parts of sulfuric acid and ninety-eight parts of water and allowed to remain in contact with the solution until any remaining zinc has been dissolved and leached out. Finally the ore is water-washed, the whole of the washings being conveyed to the solution-storage vat and strengthened by the addition of sulfuric acid, so as to be used again for the cyclic operation of dissolving out zinc from the next charge of roasted ore. The residual ore now free from zinc is discharged from the vat and dried preparatory to being smelted for the recovery of the lead, silver, or other metals contained in the roasted ore.

The zinc may be recovered from the zinc solution either by the addition thereto of caustic soda or of any analogous alkali or by electrolyzing the solution, which latter method we prefer.

The foregoing description applies to the treatment of sulfid ores containing zinc in proportions of ten per cent. and upward; but our process is also applicable to the treatment of sulfid ores which are either free from zinc or contain that metal only in small quantities of not more than ten per cent. of zinc.

In applying our process to the treatment of sulfid ores which either contain no zinc or contain that metal only in quantities not exceeding ten per cent. we use lead sulfate in such quantities that the quantity of lead sulfate is equal to the quantity of metallic sulfids contained in the ore to be treated and then roast the mixture of ore and lead sulfate and afterward proceed to treat it in the manner hereinbefore described in reference to the ore contained in the settling-vat after the solution containing the zinc salts has been drawn or leached off.

It is to be understood that although we have described our improved process as carried out by step-by-step operations in a certain consecutive order, yet the order of such steps as set out may be varied without departing from the nature of the said invention.

Having now particularly described and ascertained the nature of our said invention and in what manner the same is to be performed, we declare that what we claim is—

1. Our hereinbefore-described process for the elimination of zinc and the recovery of lead silver or other metals from sulfid ores consisting essentially in the following step-by-step operations: (a) roasting the pulverized ore with the addition of lead sulfate at such degree of heat as will not volatilize the lead contained in the ore or the added lead sulfate; (b) transferring the roasted ore while still very hot immediately from the roasting-furnace into a vat containing a solution of sulfuric acid and water and thereby causing the solution to become heated to boiling-point, or thereabout; (c) agitating the whole mixture in the said vat during the process of charging, lixiviating, extracting, and dissolving of the zinc in the same; (d) recovering lead oxid by concentration from the ore and solution while undergoing treatment in the said solution; (e) converting the lead oxid so recovered into lead sulfate to be used for adding to succeeding charges of ore to be roasted in the furnace; (f) conducting the residual ore and solution into a settling-vat and separating the solution from the ore by drawing off the solution into a separate vat; (g) extracting the zinc from the solution so separated and recovering from the said solution the sulfuric acid therein contained for use in treating succeeding charges of roasted ore; and (h) recovering the lead silver and other metals contained in the residual ore by smelting the same in any suitable smelting-furnace; all substantially as and for the purposes hereinbefore set forth.

2. In extracting metals from zinciferous sulfid ores, roasting pulverized ores with the addition or admixture of lead sulfate obtained from a source external to the ore being treated in quantity proportional to the quantity of zinc the ore contains, substantially as herein described and explained.

3. In a process of extracting metals from zinciferous ores, suitably roasting the ore with the addition or admixture of lead sulfate obtained from a source external to the ore being treated, lixiviating the roasted ore by subjecting it to an agitated sulfuric-acid solution, and then suitably recovering the metals from the ore.

4. A process of extracting metals from zinciferous sulfid ores consisting of admixing with the ore lead sulfid obtained from a source external to the ore being treated, suitably roasting the mixture, then subjecting the mixture to an agitated sulfuric-acid solution, separating by concentration the oxid of lead produced during the roasting of the admixture, then separating the solution, and then finally smelting residual ore for recovering the metals therefrom.

In testimony whereof we have signed our names to this specification in the presence of two subscribing witnesses.

JOHN C. CLANCY.
LUKE WAGSTAFF MARSLAND.

Witnesses:
FRED WALSH,
PERCY NEWELL.